(12) United States Patent
Todd

(10) Patent No.: US 7,706,517 B1
(45) Date of Patent: *Apr. 27, 2010

(54) CALL INITIATION VIA CALENDAR

(75) Inventor: Steven Todd, Westfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/215,137

(22) Filed: Jun. 25, 2008

Related U.S. Application Data

(63) Continuation of application No. 11/823,755, filed on Jun. 27, 2007, now Pat. No. 7,406,164, which is a continuation of application No. 11/522,232, filed on Sep. 15, 2006, now Pat. No. 7,251,320, which is a continuation of application No. 10/863,022, filed on Jun. 8, 2004, now Pat. No. 7,123,705, which is a continuation of application No. 09/833,225, filed on Apr. 11, 2001, now Pat. No. 6,760,423.

(51) Int. Cl.
H04M 3/56 (2006.01)
H04M 3/432 (2006.01)
H04L 12/18 (2006.01)

(52) U.S. Cl. ............. 379/202.01; 370/261; 379/207.03; 379/210.01; 455/414.1; 455/416

(58) Field of Classification Search ............... 370/260, 370/261, 262; 379/93.21, 93.23, 93.24, 202.01–206.01, 379/207.03, 210.01; 455/414.1, 446, 416
See application file for complete search history.

(56) References Cited

U.S. PATENT DOCUMENTS 5,600,797 A * 2/1997 Marshall ................. 709/224
7,406,164 B1 * 7/2008 Todd ...................... 379/202.01

* cited by examiner

*Primary Examiner*—Harry S Hong

(57) ABSTRACT

A system and method for initiating calls via electronic calendar is disclosed. A call list is associated by a user to a particular time and day within the electronic calendar. When the particular day and time arrives, the call list is forwarded to a service which executes the call list, and subsequently contacts the members of the call list. The system may initially query the callees through a prerecorded voice messaging system to determine which callees are present, and then establish a telephone connection based on responses to the queries. Once a connection is established, the user and the members of the list are linked to a conference bridge.

16 Claims, 6 Drawing Sheets

CALL INITIATION VIA CALENDAR

CROSS-REFERENCE TO RELATED APPLICATIONS

This application is a continuation of application Ser. No. 11/823,755, entitled "Call Initiation Via Calendar," filed on Jun. 27, 2007, which issued as U.S. Pat. No. 7,406,164 on Jul. 29, 2008, which is a continuation of application Ser. No. 11/522,232, entitled "Call Initiation Via Calendar," filed on Sep. 15, 2006, which issued as U.S. Pat. No. 7,251,320 on Jul. 31, 2007, which is a continuation of application Ser. No. 10/863,022, entitled "Call Initiation Via Calendar," filed on Jun. 8, 2004, which issued as U.S. Pat. No. 7,123,705 on Oct. 17, 2006, which is a continuation of application Ser. No. 09/833,225, entitled "Call Initiation Via Calendar," filed on Apr. 11, 2001, which issued as U.S. Pat. No. 6,760,423 on Jul. 6, 2004.

FIELD OF THE INVENTION

This invention relates generally to telephone/computer networks and network systems, and more specifically to a system and method for providing call initiation and scheduling via an electronic calendar on a computer or wireless device.

BACKGROUND

With computer and communication technology advances over recent years, the need for effectively merging scheduling capabilities with communication capabilities has become great. While present calendar systems allow clients to draw information and schedules from their calendar, these systems are limited in their ability to facilitate communication between an individual and a group or list of callees. Clients requiring group meeting capabilities like teachers, managers, brokers, etc. have particular problems in arranging and executing calendar calls to lists of callees.

SUMMARY OF THE INVENTION

The present invention is a method and system for initiating calls via an electronic calendar. Particularly, the host client initiates a call through a communication network, wherein the electronic calendar associates a call list with the calendar. The calendar allows the client host to schedule a call on a particular day and time, where the associated list may be edited or updated automatically or manually, and can be stored in a local memory or in a network storage medium. The communication network receives the request from the host client and subsequently arranges communication with the other members from the call list electronically (audio, video, etc.).

BRIEF DESCRIPTION OF THE DRAWINGS

The following drawings illustrate various embodiments of the present invention.

DETAILED DESCRIPTION

Figure 1:
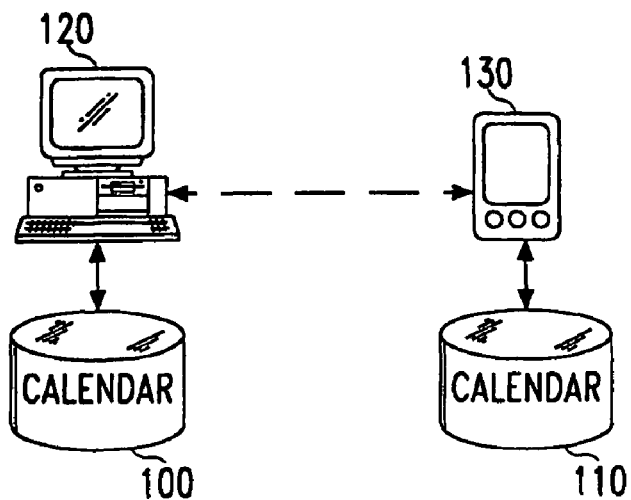
FIG. 1 illustrates communication between a computer or hand-held device with the calendar.
Figure 1A:
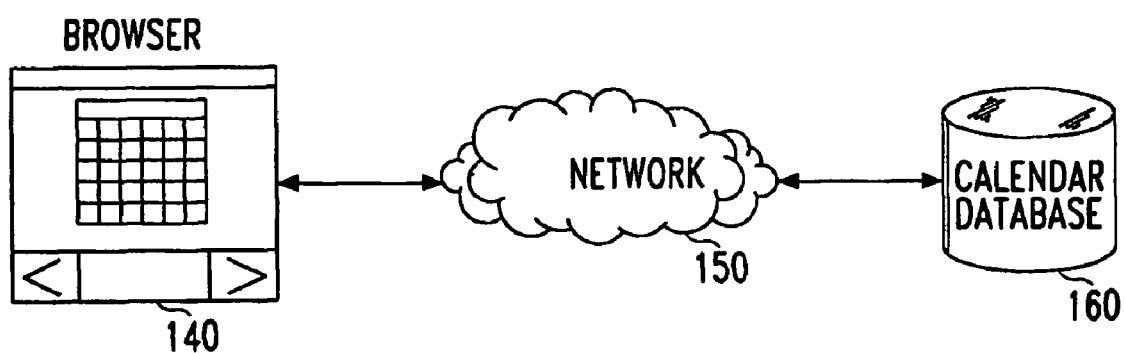
FIG. 1A illustrates communication between the browser and a calendar database.

FIG. 1 illustrates an embodiment of the invention, wherein a personal computer 120 or a hand-held device 130 is accessing a calendar (100 and 110, respectively) on a local database. The computer or device may typically access the database through a resident browser 140. The database may be a local hard drive or may be accessed through a network or LAN. FIG. 1A discloses the browser connecting through a network 150 to a calendar database 160.

Figure 2:
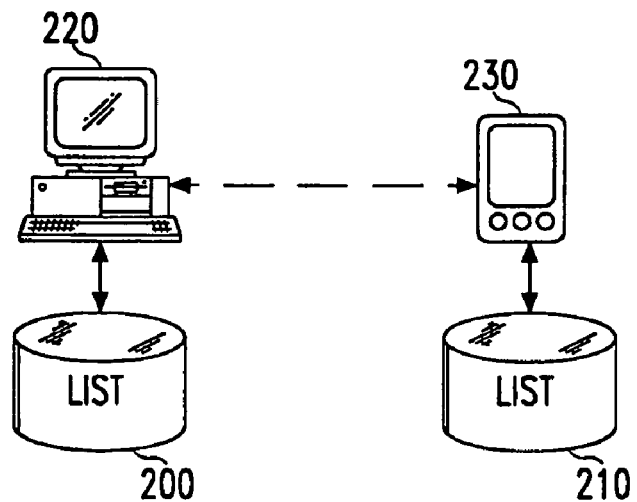
FIG. 2 illustrates communication between a computer or hand-held device and the call list database.
Figure 2A:
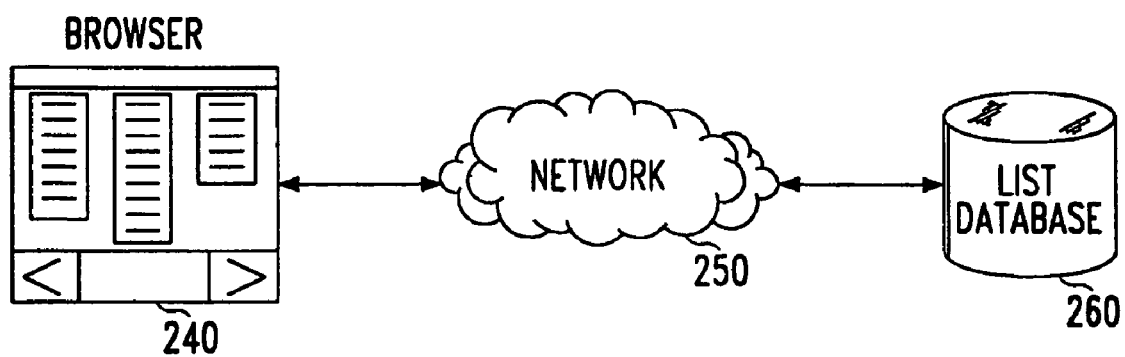
FIG. 2A illustrates communication between the browser and the list database.

Similarly, FIG. 2 discloses a personal computer 220 or a hand-held device 230 in communication with a call list (200 and 210, respectively) on a local database. It is understood that the call list and calendar may be stored on the same medium, provided that sufficient memory is available. Likewise the list may also be accessed remotely through a network. FIG. 2A illustrates a list database 260 accessed through a browser 240 on a network 250. Thus, for example, if a client manages a weekly meeting with staff, the client may obtain a list (or lists) of staff members from a database 260, and store the staff list on a computer, network, or some portable device that can be accessed by the browser. This list may subsequently be modified or stored into permanent memory for future use.

Figure 3:
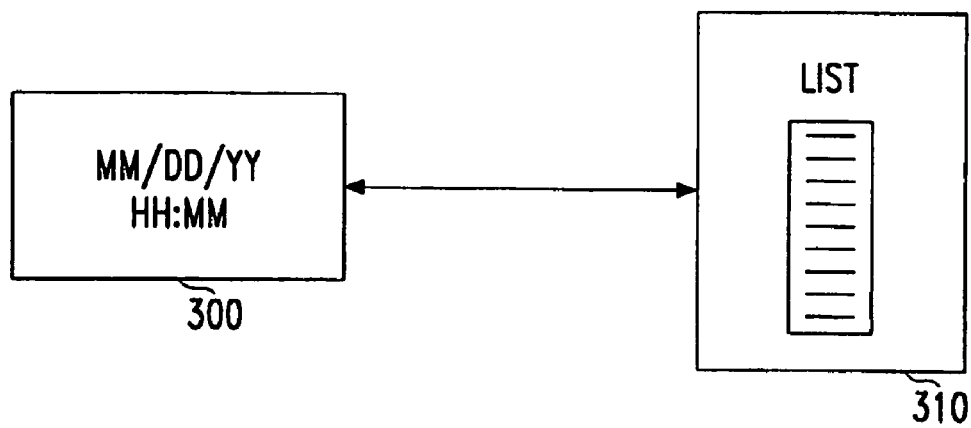
FIG. 3 illustrates communication between the calendar logic and a list from the list database.
Figure 4A:
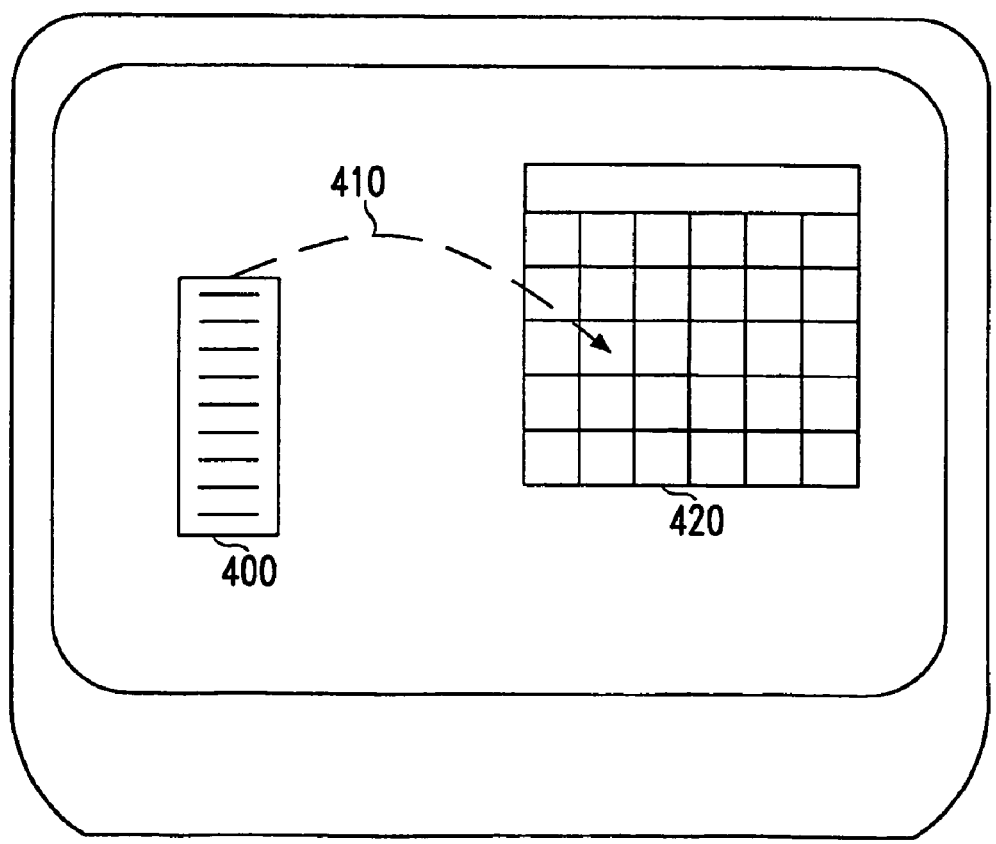
FIG. 4A illustrates a host client incorporating a list into an on-screen calendar.

FIG. 3 illustrates a class diagram wherein the calendar 300 contains logic to identify the month/day/year, as well as the hour/minute. The calendar may thus identify a specific time on a particular day where a list 310 will be associated with the calendar. Thus if a client has a weekly meeting with the sales group every Friday at 2:00 PM, the calendar may be configured to retrieve a sales group list (310), wherein the sales group list will be associated with the calendar for that time. FIG. 4A illustrates an embodiment where a client may obtain a list 400 and "drag" 410 that list onto a calendar 420 that appears on a screen. The dragged list will then be associated with the graphical representation of a particular day and/or time shown on the calendar. This feature may be executed on a computer screen or on a handheld device that provides dragging capabilities.

Figure 4B:
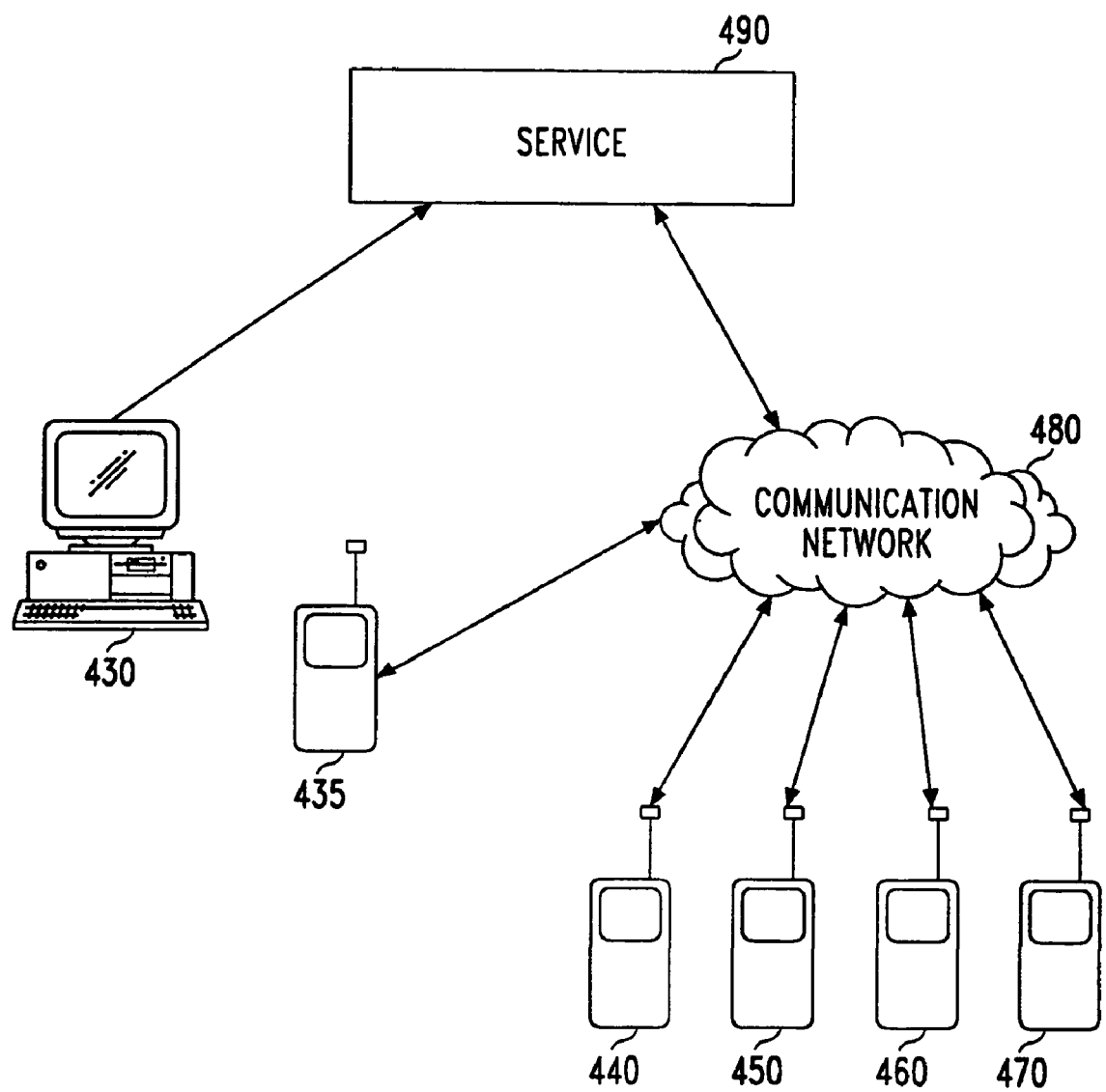
FIG. 4B illustrates the host client communicating through the system to members of the call list.

FIG. 4B illustrates an embodiment of the invention where the client computer 430, 435 establishes communication with a call group 440-470. Initially, the client retrieves and associates a list to the calendar (shown in FIGS. 1-4A) via a computer 430, or some other processing device. The client also has a telephone 435 that is associated with the computer 430. The telephone 435 may be separate from the computer 430, or may alternately be integral to the computer or processing device 430. Once the call list appears on the screen of the client in the calendar, the client may click on the list or calendar to initiate a call to the call group. Thus, once a call group list is activated through the calendar, the computer 430 communicates with the service 490, which the establishes a connection with a communication network 480.

The service 490 will preferably identify the caller, as well as the list of numbers that are to be called (the "callees"). Each of the callees 440-470 will then be contacted through the communication network 480, wherein a group conference may subsequently be had. It is understood that the communication network 480 may be a conventional telephone network, or may also be a digital or digital/analog network that allows voice and/or image data to be transmitted (e.g., ISDN, WAP, etc.). The service 490 recognizes the client computer 430, and places the remaining callee's 440-470 into the conference bridge. The service then notifies the client of a conference initiation and then proceeds to connect the remaining members of the call list (callee's) into the communication network, where all connected parties may interact with one another. Each of the participants may be notified of the conference call by a pre-recorded message or text or data message.

Figure 5:
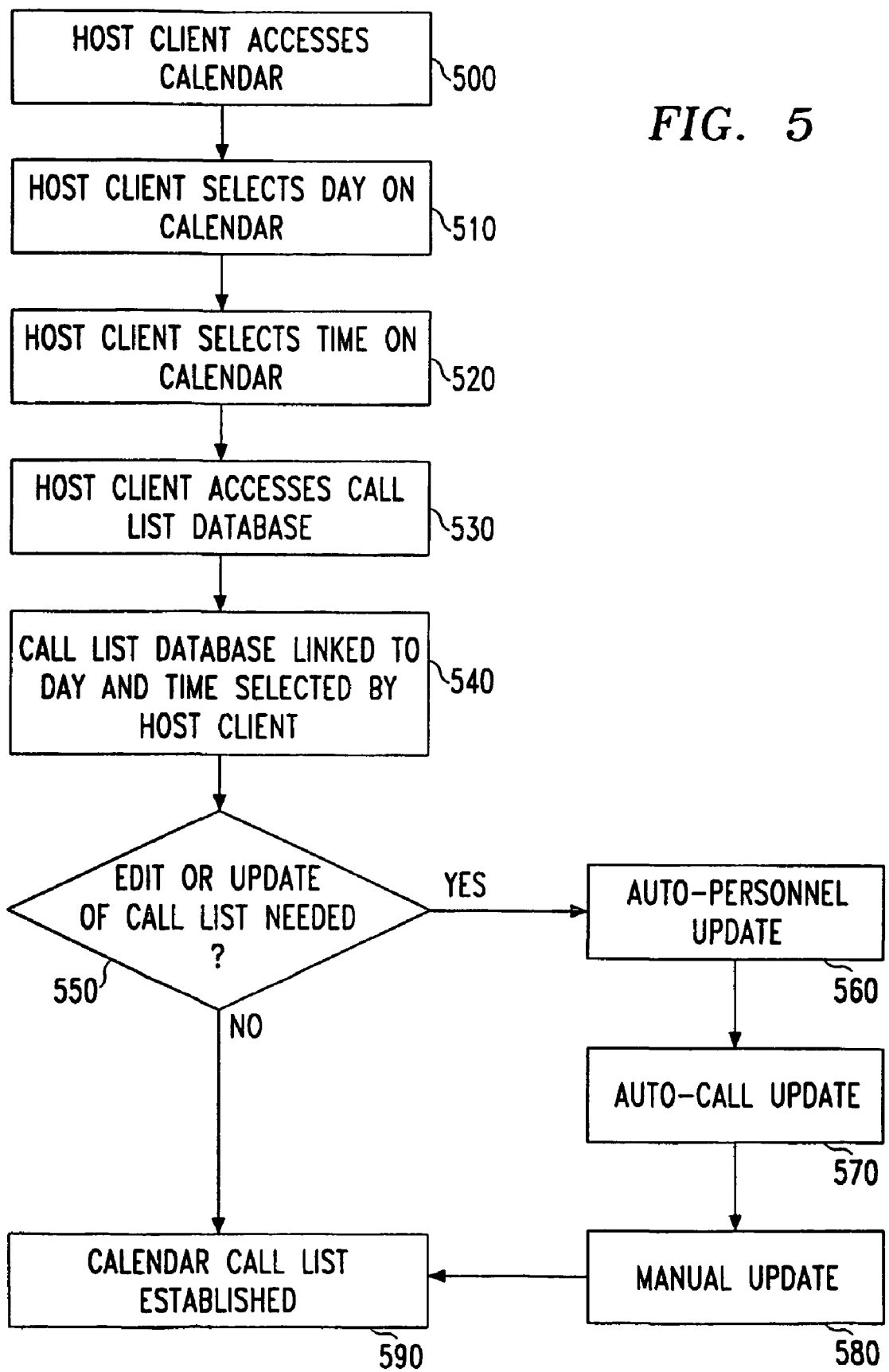
FIG. 5 illustrates a process for establishing a call list for a host client according to an embodiment of this invention.

FIG. 5 illustrates in a flowchart how a host client establishes a calendar call list for a specific time on a calendar day. The host initially accesses the calendar 500, which may reside in the host client's computer or on a network. Once the calendar appears on the host client's screen, the host client may then select and specify a day on the calendar 510 in which to conduct a call. Once the day is established, the host client may then select an appropriate time for that day 520. After the time and day are established, the host client may then determine the callees that will be participating in the call. The callees can be manually entered into a call list and stored, or imported from pre-existing call lists that are stored in a storage medium, either locally or remotely. It is understood that, under the present invention, the host client may also manually type in a time and date as text, and have the text converted and inserted into the calendar software.

Once the call list is accessed by the host client 530, the call list may then be linked into the date and time selected in the calendar software 540. Once the call list is linked to the calendar, the list will remain in the calendar until the scheduled time arrives. Thus, the calendar call list will be established 590, providing no edits or updates are needed for the call list. However, if it is further determined that the call list requires editing 550 (i.e. the addition of deletion of callees from the list), the host client may retrieve the call list for such purposes. The editing may also occur automatically through a maintained personnel update 560, or an auto call update 570. For example, if a human resource department maintains and updates a personnel list of various departments, any updated personnel call lists may be automatically inserted or replaced with the call list initially chosen by the host client. Also, if a call history is maintained for the host client, the numbers previously dialed for a particular project, may automatically be inserted or replaced through the auto-call feature. Any additional updates desired by the host client may be also manually updated 580 by the host client. Once any updates (560-580) are completed, the calendar call list is established 590.

Figure 6:
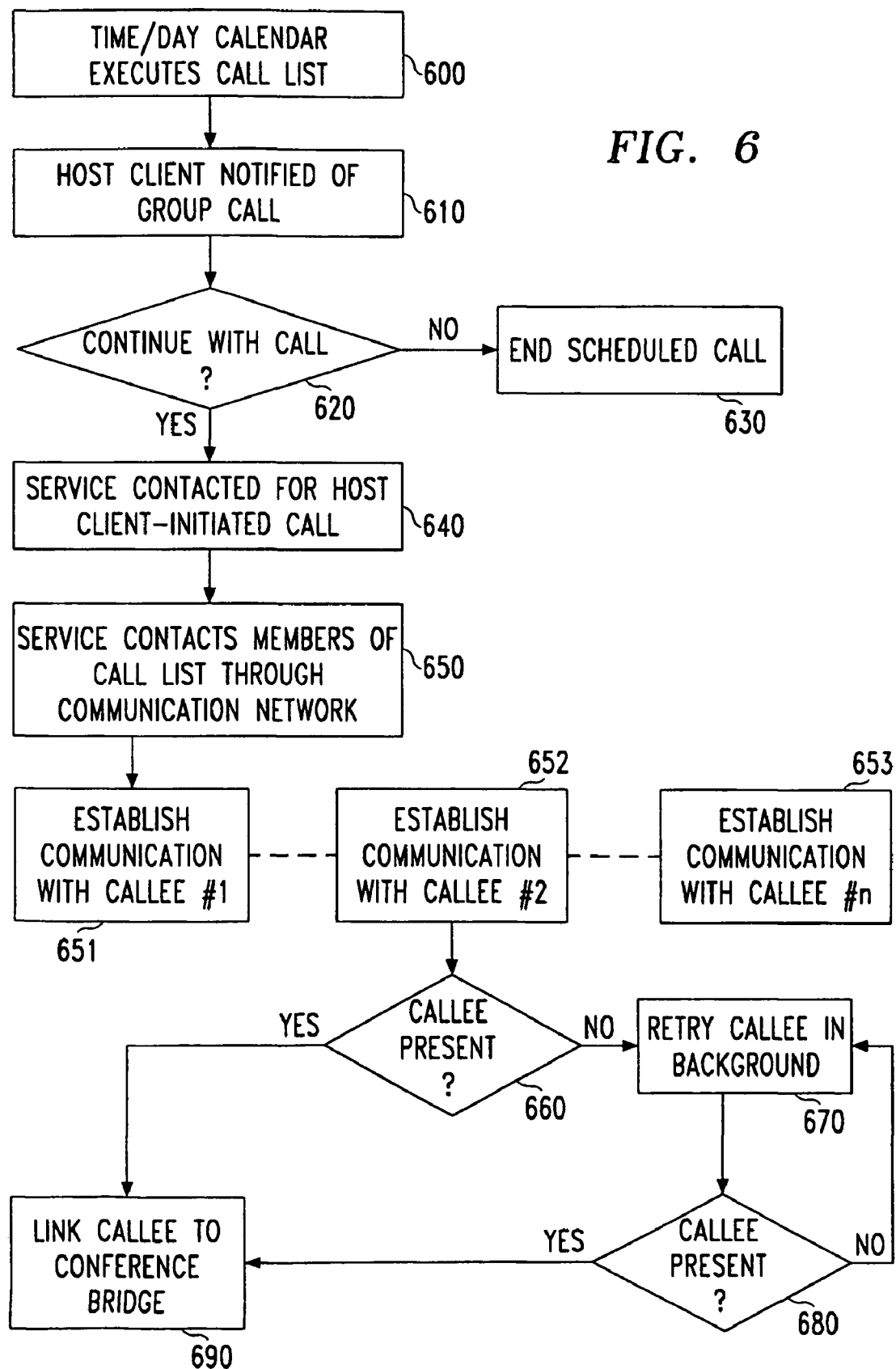
FIG. 6 illustrates a process for establishing multiple callees in a conference link.

FIG. 6 illustrates an embodiment of the call execution once the host client establishes a calendar call list. Once the managing algorithm identifies a specified time, the time/date calendar executes a call command for the call list 600. The host client is then notified of the call execution 610. The notification can come in the form of a text message, or may appear as a pre-recorded voice message on the host client's communication device (e.g., telephone, computer, wireless device, etc.). Furthermore, the call does not have to start automatically when the scheduled date and time occurs.

The host can alternately set a preference that requires him or her to open the calendar and "click" on the meeting/call list in order to initiate the call. Nevertheless, once the host client is alerted to the group call, the host client may then choose to continue with the call 620, wherein the calendar contacts the service 490, instructing the service 490 to establish communication through the network 480 with the host's telephony device 435. However, if the host client decides not to proceed with the call, the scheduled call is cancelled 630, thus ending the call initiation.

Once the service is contacted 640, the service then proceeds to contact (or redial) each member of the call list through the communication network 650. An example of the communication scheme is illustrated in FIG. 4B. The service queries each of the callees in the call list (650-653) to determine which callees are present for the call 660. If the callee responds affirmatively, the callee is linked to the call bridge 690, wherein the conference call is conducted. If the callee "opts out" of the call, or does not respond, the service may either terminate for the callee (if the callee "opts out"), or may continue to retry the callee in the background 670.

Thus, the callee may receive repeated queries by the service, until the callee responds. Again, the queries may appear as text messages, or as a pre-recorded voice message. Once the callee responds, he or she will then be linked into the conference bridge 690, where the callee may join in to the conference currently in session. It is understood that the service may be instructed to run a limited amount of iterations before terminating the callee. For example, the service may be programmed to terminate after the callee fails to respond after five queries for callee presence.

It is understood that the discussion of the present invention has been presented for purposes of illustration and description, and is not intended to limit the invention to the form disclosed herein. Thus, various alterations and modifications can be made to the present disclosure by one skilled in the art without deviating from the spirit and scope of the invention. It is also understood that the invention is equally applicable to computer systems, telephone systems, and wireless systems, and that additional features regarding the call lists, service contact, call execution, and callee connection may be implemented to increase the "user-friendliness" of the system.

I claim:

1. A system for initiating an audio host client call, comprising:

a) at least one computer storage medium;

b) at least one processing apparatus, communicatively coupled to the at least one computer storage medium;

c) an interface, communicatively coupled to the processing apparatus;

d) a calendar means, stored in said at least one computer storage medium and communicatively coupled to the interface;

e) an executable call list containing a list of callees, stored in said at least one computer storage medium and communicatively coupled to the interface;

f) a prerecorded voice messaging system communicatively coupled to the interface for querying callees on the call list;

g) communication means, for establishing audio communication on a network among callees responding affirmatively to a prerecorded voice message query, and h) maintained personnel update means containing personnel data, the maintained personnel update means communicatively coupled to the executable call list for updating the call list according to the personnel data;

wherein the computer storage medium comprises computer executable code that, when executed by the processing apparatus, causes the communication means to execute the call list via the calendar means through a network.

2. A system according to claim 1, wherein the prerecorded voice messaging system accepts "opt out" messages from callees and the communication means terminates communication with a callee that opts out.

3. A system according to claim 1, wherein the interface includes at least audio inputs communicatively coupled to the host client.

4. A system according to claim 1, wherein the interface includes an output communicatively coupled to an analog telephone network.

5. A system according to claim 1, wherein the interface includes an output communicatively coupled to a digital telephone network.

6. A system according to claim 1, wherein the interface includes an output communicatively coupled to a wireless telephone network.

7. A system according to claim 1, wherein the call list is linked to the calendar means.

8. A system according to claim 7, wherein the calendar means is configured to activate the call list at a specified time and date.

9. A system according to claim 1, wherein the at least one processing apparatus executes the call list to activate the communication means to transmit over the network to at least one remote telephonic device.

10. A method for initiating a host client call comprising:
 a) establishing in a computer a call execution for a device with a date and time on an electronic calendar;
 b) associating at least one call list with the call execution, the call list containing at least one callee;
 c) communicating the call list to a computing device upon call execution;
 d) transmitting a prerecorded voice message query to at least one callee to determine whether the callee is present for a call;
 e) establishing a network connection with at least one remote audio communications device in accordance with responses from the at least one callee to the query;
 f) linking the device and the at least one remote device to at least one conference bridge; and
 g) updating the call list using call history data contained in an auto call update means communicatively coupled to the call list.

11. A method according to claim 10, further comprising the step of:
 g) receiving in response to the prerecorded voice message query an "opt out" message.

12. A method according to claim 10, wherein communicating the call list includes transmitting over a data line.

13. A method according to claim 10, wherein transmitting the prerecorded voice message includes transmitting over a data line.

14. A method according to claim 10, wherein establishing the network connection includes transmitting over a telephone line.

15. A system for initiating an audio host client call, comprising:
 a) at least one computer storage medium;
 b) at least one processing apparatus, communicatively coupled to the at least one computer storage medium;
 c) an interface, communicatively coupled to the processing apparatus;
 d) a calendar means, stored in said at least one computer storage medium and communicatively coupled to the interface;
 e) an executable call list containing a list of callees, stored in said at least one computer storage medium and communicatively coupled to the interface;
 f) a prerecorded voice messaging system communicatively coupled to the interface for querying callees on the call list;
 g) communication means, for establishing audio communication on a network among callees responding affirmatively to a prerecorded voice message query; and
 h) maintained call history update means containing numbers previously dialed, the maintained call history update means communicatively coupled to the executable call list for updating the call list according to the numbers previously dialed;
 wherein the computer storage medium comprises computer executable code that, when executed by the processing apparatus, causes the communication means to execute the call list via the calendar means through a network.

16. A method for initiating a host client call comprising:
 a) establishing in a computer a call execution for a device with a date and time on an electronic calendar;
 b) associating at least one call list with the call execution, the call list containing at least one callee;
 c) communicating the call list to a computing device upon call execution;
 d) transmitting a prerecorded voice message query to at least one callee to determine whether the callee is present for a call;
 e) establishing a network connection with at least one remote audio communications device in accordance with responses from the at least one callee to the query; bridge; and
 f) linking the device and the at least one remote device to at least one conference bridge; and
 g) updating the call list using personnel data contained in a maintained personnel update means communicatively coupled to the call list.

* * * * *